Figure 1:
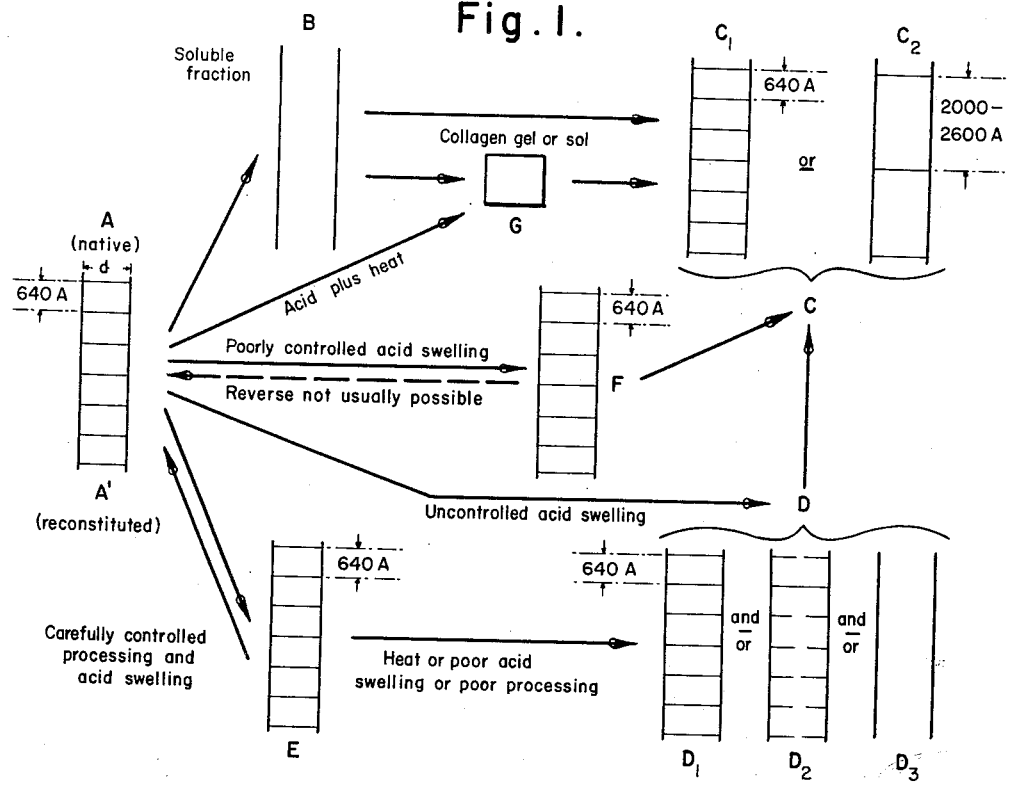

United States Patent Office 3,071,477
Patented Jan. 1, 1963

3,071,477
PROCESS OF FORMING COLLAGEN ARTICLES
Howard B. Klevens, 6801 McPherson Blvd.,
Pittsburgh, Pa.
Filed May 21, 1959, Ser. No. 814,773
11 Claims. (Cl. 99—176)

This invention relates to the manufacture of formed collagen articles and particularly to an article of formed collagen and a process for forming articles such as films, tubes, casings, strands and the like from reconstituted collagen.

Collagen is a proteinaceous material found in animal skin, bones, tendons and in the supporting fibrous material of tissue. Commonly collagen is associated with a multitiude of other substances such as keratin, hair, elastin, mucin, reticulin, some lipids and insoluble bound cations. Collagen in order to be useful must be separated from these associated materials before it can be used in the manufacture of formed collagen articles.

Collagen, as a naturally occurring material, is substantially insoluble in water but it is known that it can be rendered soluble in water by various treatments such as elevated temperatures, prolonged exposure to acids, alkalis, or various salts, enzymes and bacteria and thereby degraded to form gelatin.

Gelatin has not proven satisfactory for the formation of formed edible articles such as casings for sausage etc., because of its lack of strength particularly when wet. Since wet strength is one of the commercially most necessary and important characteristics necessary in films such as sausage casings, various attempts have been made to prepare collagen suspensions and to thereafter reconstitute such suspensions into formed articles such as sausage casings, filaments, films, etc. However, the resulting products have retained few of the physical and biological properties of the original collagen but, on the contrary, the properties of these products have approached those of gelatin. This is primarily the result of degradation of collagen by denaturation and hydrolysis during the processing of the collagen. For example, in one prior technique the tissue from which collagen may be extracted is subjected to acid treatment and high temperatures which results in partially or completely hydrolyzing the collagen to gelatin. The formed strands from this material are so weak that special belts are required to assist in carrying the extrusions at least during the initial processing stages. In other processes the tissues are mechanically shredded to short fibres, carded and then formed in the manner of textile fabrics. Another process involves extracting the soluble form of collagen, termed procollagen, with a buffered aqueous citric acid solution. However, the citrate soluble procollagen fraction of collagen tissue is generally on the order of only a few percent of the total collagen, necessitating the treatment of large amounts of tissue for the production of a small amount of procollagen. Still another process involves the use of disintegrated tendons which, after acid swelling, are cast as films. These films are cut into strips and twisted to form strands.

In most of the foregoing processes the solids content of the dispersion is of the order of 8–25%. Such highly concentrated solutions or dispersions are of necessity composed principally of highly degraded or denatured collagen systems and may be generally classified as gelatin sols or gels.

The product of such systems was not satisfactory for the commercial production of collagen articles. Articles such as films produced from these systems generally show a zero wet tensile strength and generally exhibit measurable tensile strength only in the dry state.

I have discovered that articles may be made from reconstituted collagen having substantailly the physical and biological characteristics of the original collagen provided certain precautions and steps hereafter set forth are observed. In the practice of my invention certain previously known techniques and principles are incorporated, however, my invention is distinguished from prior processes by the inclusions of steps and controls which I have found critical to the production of a reconstituted collagen film capable of producing high wet strength and other characteristics of native collagen.

Figure 2:
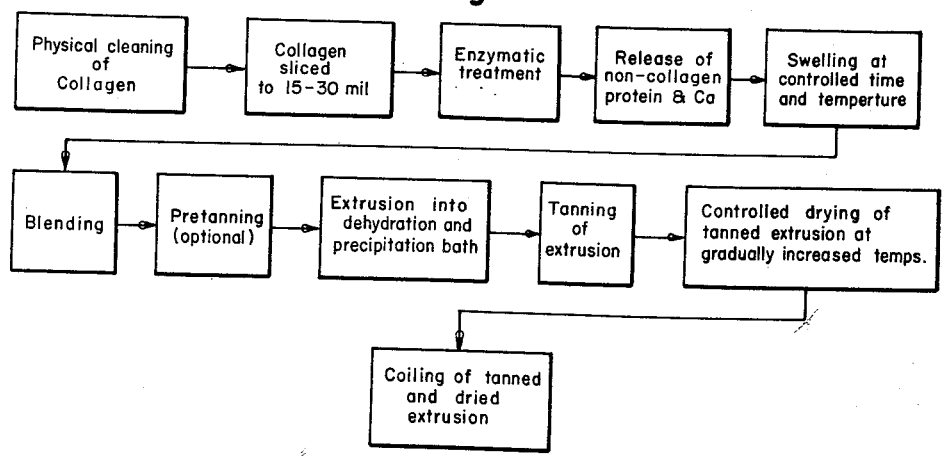

In the accompanying drawings, I have illustrated in
FIGURE 1 a schematic drawing showing the relative and average condition of the several forms of collagen discussed hereinabove as they appear in the electron microscope; and
FIGURE 2 a schematic flow sheet of my process.

A collagen fiber is a bundle of long fibrils generally spherical in character; one such of the latter is schematically shown as A. Initial swelling, possibly coupled with some other treatment to remove connective tissue and elastin, of the fiber, first by maceration or slicing, and then by mild acid treatment, will result in a dispersion of fibrils of type E, type F, or type D. If type E is formed, it is readily possible by the technique described herein to reverse the process and produce reconstituted collagen A' in numerous forms which have properties, especially wet tensile strength, quite similar to the native collagen. If type F is produced, the reversion to a native-like form is not always possible. If type B is obtained and G is formed by heating to about 60° C. in order to liquefy the concentrated gel or dispersion, it is not possible to return to A. Rather, one produces C with 640 A. spacings. Type E may be converted to type $D_3$ which is amorphous, by heating to 35° C. or more or by excessive swelling by prolonged treatment with acid and the like swelling agents.

The collagen identified in the drawing as type A is illustrative of an average fibril obtained from adult beef tendon in its native condition. The strands are spherical and have high wet strength but are intermingled with non-collagenous materials such as elastin and other connective tissues. These fibrils are long spherical shaped bundles of collagen molecules and it is observed that the spherical shape is retained even upon dehydration in a vacuum system. The citrate soluble collagen as shown and identified as B is amorphous, and has little wet strength on reconstitution. These materials retain their spherical shape on lyophilization but when placed on a metal screen for electron microscope studies and subjected to vacuum they lose their sphericity and become flattened or slumped, indicating that they have lost some element of their native structure, which apparently cannot be recovered completely upon reconstitution.

The illustration identified as C is illustrative of the reconstituted collagen derived from B. It has little or no wet strength and may contain impurities.

The collagen identified as D shows little banded structure and the strands are flattened indicating a high degree of lateral swelling along the horizontal axis. These fibrils will retain their spherical shape on lyophilization but will flatten on rewetting. These have zero wet strength on reconstitution.

The collagen illustrated as E on the drawing shows a uniform 640A. structure at all processing steps. The strands retain their spherical shape whether lyophilized or not, and show a minimum of radial swelling without any horizontal flattening or deformation out of their native cylindrical shape. These materials are produced by the instant invention. The product A' produced by reconstituton of this collagen preparation E has high wet strength and physical properties essentially identical with those of native material, e.g., its thermal shrinkage is almost identical with that of A. Enzyme degradation is substantially identical with A. Upon heating above 25°–30° C. these materials will degrade to the form shown in D.

The collagen form shown as F results from excessive degradation; it shows lateral flattening and out-of-roundness similar to D. It shows zero wet strength on reconstitution.

The form of collagen shown at G is a 5%–15% dispersion heated to 60° C. to liquefy. This material is amorphous and has zero wet strength on reconstitution.

It is characteristic of materials according to my process that their size distribution (diameters) closely follows that of the native collagen but in the swollen state is displaced slightly (5%–15%) toward an increase in diameters. Materials made by other processes have a much greater displacement in the swollen state along the increased diameter axis (20% and more) and a much reduced displacement by way of numbers of particles having intermediate diameters. In the unlyophilized state it is characteristic of my materials that they remain spherical under the electron microscope indicative of a very low degree, if any, of degradation or denaturation, whereas other collagen materials are soft and therefore show marked lateral flattening with a corresponding increase in width but decrease in height, indicative of a higher and excess degree of degradation.

In a preferred practice of my invention I remove adhering hair, fat, tendon sheath and the like refuse from a collagen containing tissue as for example animal skin or tendon. This refuse removal may be accomplished manually or mechanically. The collagen containing tissue is then cut or sliced into particles of about 15 to 30 mils in thickness. This may be accomplished by a rotary slicer or similar known mechanism.

The sliced tissue is thereafter treated with an enzyme having mucase and/or elastase activity. This enzyme acts on the mucin and/or elastin which are intermingled with the collagen fibres. Preferably such an enzyme may be isolated from defatted powdered pancreas by repeated extraction with phosphate buffer at about pH 6.0. However, other elastase active materials may be used, such as extracts from microorganisms obtained by selective culture, as well as from certain yeast forms already known in the art.

The enzymatically treated collagen fibres are then washed thoroughly and treated wtih a material capable of combining with lipids and calcium to solubilize and sequester them and to assist in the further release of non-collagenous protein material. Materials usable in this step include sodium carbonate, salts of polyphosphoric acid such as sodium hexametaphosphate and the like. The treated collagen fibres are washed repeatedly to remove the solubilized and sequestered impurities as well as the non-collagenous proteins released from the collagen fibres.

The collagen fibres are next reacted with a swelling agent such as an acid or a peptizing agent for a short, controlled period of time so as to produce a carefully limited degree of swelling at carefully controlled temperatures.

Preferably the temperature is maintained at about 10° to 20° C. and never allowed to rise above about 25° C. and the swelling processing is carried out for between about 1 and 4 hours with slow and gentle agitation. Preferably the swelling time is kept as short as possible. During this period all local heating such as would be produced by high speed blending and high pressures must be avoided.

After initial swelling has been completed the swollen mass is blended or homogenized by passing over a series of cooled stainless steel rolls progressively spaced closer together or by repeated passes through a series of classified stainless steel jets ranging in diameter down to about 0.03 inch. Again local heating must be avoided and the temperature held in the area of about 10° to 20° C. In the homogenizing step attempts to homogenize dispersions containing too high concentrations of solids should be avoided, for their processing causes local overheating and resultant degradation.

To obtain a thoroughly homegeneous dispersion the portions of collagen containing tissue which have not been swollen or have been only partially swollen by the foregoing treatment should be removed. This may be accomplished by passing the mass through a series of classified stainless steel screens ranging in size from about 10 mesh to about 60 mesh per centimeter.

If the system has entrained air during the processing this should be removed by evacuation.

Finally the collagen dispersion is extruded through a suitable orifice, depending upon the shape and characteristics desired in the final film. The dispersion is extruded into a liquid capable of dehydrating and/or precipitating the dispersion. For this purpose concentrated solutions of salts such as ammonium sulfate may be used however, optimum results have been obtained using acetone, containing 5% to 20% water plus sufficient alkali such as ammonia or ethanolamine to neutralize any residual acid.

It has been found advantageous when extruding cylindrical objects such as casings to maintain a small positive pressure on the inner surface of the extrusion. This may advantageously be accomplished by using air, or by the use of mixtures of gaseous agents such as air, ammonia, formaldehyde, etc.

Pretanning may be accomplished by adding tanning agents to the dispersion just prior to extrusion. For this purpose a solution of formaldehyde, a dialdehyde such as glyoxal, or methyl glyoxal, or one of a number of reducing sugars such as maltose, lactose or mannose, or hexamethylamine, alum or the syntans or any other of the tanning agents known to the art, or a combination of one or more of those materials have been found satisfactory. The concentration of tanning agent will depend upon the end product desired.

Following extrusion the dehydrated formed film may be passed directly to a tanning bath. Tanning agents such as those mentioned in the pretanning step may be used here also. However, if no pretanning has taken place, the concentration of agents in the tanning step must be increased.

A positive internal pressure should be maintained on the film during the latter stages of dehydration, washing, tanning and drying together with some tension in the direction of extrusion.

The final processing step before collection of the extruded film on rolls is a heating cycle which completes dehydration and effects completion of the tanning. Since these films, particularly casings, are very thin, this heating cycle can be completed in minutes or fractions of an hour rather than the long periods usually used. This heating step and its length of time depends in large measure on the water content of the film at the end of tanning which in turn is at least partially dependent upon the tanning agents used. This heating cycle can be accomplished by passing the film through circulating air of gradually increasing temperature from about 20° to 25° C. at the end of the tanning bath to about 60° to 65° C. in the region of the collection rolls. Where some tanning agents are used such as glyoxal, the reducing sugars, etc., the final temperature should be in the range 90° to 110° C.

I have found that certain fluidizing agents will reduce the viscosity and permit some increase in concentration above the 1% to 2% concentrations normally used without deleteriously affecting the suspension. Substitution of 30% to 60% solution of methanol in water, 5% to 20% chlorethanol, fluorethanol, glycol, or hydracrylonitrile in water, 3% to 10% glycol monoethyl ether in water or any of a number of other alcohols and ethers in water for the water used in the swelling steps makes possible increases to the range of 2½% to 4% of collagen in suspension.

I have discovered that in the processing step following enzyme treatment, a non-ionic detergent in addition to the solubilizing and sequestering salts may be used as an aid in cleaning the collagen without detrimentally affecting the collagen. Ionic detergents on the other hand, have a very detrimental effect at this point. I have found that for this purpose a 0.05% to 1.5% solution of various ethylene oxide derivitives of paraffinic alcohols such as polyoxy alkylene fatty ethers or of sorbitan monoalkylate such as polyoxyethylene sorbitan monopalmitate are satisfactory. Preferably I find that a single non-ionic detergent or mixture of non-ionic detergents having a hydrophilic-lipophilic balance of about 13-17 are most satisfactory and their use produced a lighter colored end product of the collagen.

Flexibility of the collagen film is for many purposes a highly desirable, even necessary quality. I have found that this property may be imparted to the ultimate collagen film by the addition of small amounts of certain protein softening agents having a degree of polarity between methyl alcohol and the polyethylene glycols such as dilute solutions (0.05% to 2%) of glycerin, sorbitol, ethylene glycol monoethyl ether and similar low molecular weight polyethylene glycols in the washing step. These additions have the advantage of eliminating any tendency to brittleness and resulting weakness on aging.

I have found that mixtures of collagen taken prior to the precipitation step of my process with water soluble dextrans (high molecular weight polysaccharides) may be used in place of collagen alone for the extrusion of films. The resulting films have good shrinkage characteristics and other properties necessary for the formation of a good synthetic sausage casing.

I have discovered that good synthetic collagen films particularly sausage casings may be produced provided the foregoing steps are practiced and the temperature and time of the foregoing processing steps are carefully controlled to prevent excessive degradation.

It is important in the practice of my invention that the temperature and time in all operations and particularly during swelling be so controlled as to produce a swollen fiber whose axial periodically remains substantially 640± 40 A., and whose shape remains cylindrical, and shows a minimum change from the native collagen shape and whose average diameter in the swollen state has increased not more than about 5% to 15% over the native collagen and which is free of amorphous characteristics.

The process of this invention may perhaps be better understood by reference to the following examples and the drawings.

*Example I*

The soft portions of beef tendon, the deep flexor and superficial flexor tendons, preferably obtained from freshly killed steers but salted or frozen tendon may also be used, were stripped of their outer sheaths and trimmed free of fat and other extraneous tissues. These soft portions were then washed thoroughly in cold water to remove any soluble impurities, and then were frozen to assist in slicing. Transverse slices, of the order of 0.7 to 0.8 mm. were soaked in a clarified enzyme solution at a pH of 7.5 for 12 to 15 hours at 37.5° C. The enzyme preparation was similar to that described by Balo (Biochem. J., 46, 384, 1950) and involved a repeated extraction with phosphate buffer at pH 6.0 of defated and powdered pancreas.

Repeated washings with distilled water removes much of the mucin, elastin and fats which were released from the tendon slices by the above mucase and/or elastase active enzyme preparation. Further removal of these impurities is realized by soaking the tendon slices in a dilute sodium carbonate solution (similar results were obtained by soaking in a dilute solution of equal amounts of sodium carbonate and sodium hexametaphosphate) for 2 to 3 hours at 37° C. For 100 parts by weight of tendon, on a dry weight basis, about 1000 parts of the above solutions, at a concentration of about 1% and a pH of 7.5, was used. Repeated washings removed those impurities released during this soaking.

To the washed tendon slices, sufficient 0.4% lactic acid solution at 15° C. was added to bring the total weight to 6000 parts. This mixture is stirred very gently for two to three hours and then repeatedly passed between a series of cooled rolls to produce an apparently homogenous dispersion. Unswollen or only partially swollen portions of the tendon were removed by passing the dispersion through a series of classified stainless steel screens ranging in size from about 10 to 60 mesh per cm. The temperature during all this subsequent processing was kept at about 15° C.

The purified collagen dispersion at about 1.5% solids was extruded through an annular nozzle so constructed that a section of the internal portion of the nozzle rotates. This is done so that the revolving portion of the nozzle produces a partial displacement or de-orientation of the collagen fibrils so as to arrange the fibrils in intercrossing directions.

The collagen dispersion was extruded into a coagulating and dehydrating circulating acetone bath, kept under such control that the concentration of water in the bath was in the range of 8% to 12%, and the concentration of ammonia was about 1% to 2%. Air was pumped into the casing through an orifice in the center of the nozzle so that an excess pressure of about 10 to 15 mm. was maintained during the initial dehydration and tanning stages of the processing.

The moisture content of the casing decreased to less than 40% after passage through the dehydrating bath and hot air, about 40° to 45° C. was blown over the casing to assist in further evaporation of volatile liquids. The casing was then passed through a circulating tanning bath in which the formaldehyde level is maintained at a concentration of 0.07% to 0.09% and the pH at 2.8 to 3.0.

A stretching of about 10% to 12% was applied to the casing during the drying stages. The latter drying stage involves blowing progressively hotter air over the casing reaching a temperature of 70 to 75° C. just before winding on the collecting rolls.

During each step in the above processing, samples were withdrawn to measure any possible degradation of the collagen. Films were prepared by evaporation of the dispersion on Teflon, soaked in buffer solutions at pH 7.2, washed and air dried. Shrinkage temperatures were within 2 to 4 degrees lower than those observed for sections tweezed from the original tissue. Electron micrographic studies on these same dispersions showed essentially those characteristics as illustrated in E in the case of the lyophilized dispersions and more like A in the case of the dehydrated films. Dry tensile strengths averaged about 55 to 60 kg./mm.$^2$ and wet tensile strengths averaged about 10 to 12 kg./mm.$^2$. When lightly tanned, the casings will withstand all stresses which might be applied during stuffing, filling and further treatment. As an example, these casings will withstand for more than one half hour excess internal pressures of more than 0.2 atmosphere at temperatures about 90° C. without bursting.

*Example II*

The tendon slices were treated initially as in Example I except that commercial preparations of lipase were used in place of the enzyme with mucase or elastase activity which was isolated from pancreas. The electron micrographs showed a somewhat greater degree of swelling than observed in Example I and the tensile strengths were about 10% to 15% lower.

*Example III*

The tendon slices were treated initially as in Example

I except that commercial preparations of trypsin were used in place of the enzyme with mucase or elastase activity which was isolated from pancreas. The electron micrographs showed a somewhat greater degree of swelling than observed in Example I and the tensile strengths were about 10% to 15% lower.

*Example IV*

The tendon slices were treated initially as in Example I except that an extract, having some mucase and/or elastase activity, isolated from an as yet unidentified organism, obtained by the method of selective culture, was used in place of the extract from powdered pancreas. The electron micrographs of the swollen dispersions showed about the same small degree of lateral swelling observed in the preparations of Example I and the various tensile strengths were approximately the same also. Shrinkage temperatures averaged about 4 degrees lower than the original untreated tissue.

*Example V*

Collagen dispersions from Example I were heated in a constant temperature water bath at 35° C. for fifteen minutes. Electron micrographs showed fibrils with an amorphous pattern such as observed in $D_3$. Tensile strengths of films were dry 30 to 35 kg./mm.$^2$; wet strength was essentially zero. Shrinkage temperatures were noticeably lower by 20% to 25%.

*Example VI*

Collagen dispersions from Example I were heated in a constant temperature bath at 25° C. for 24 hours. Electron micrographs showed fibrils to be much more swollen than in unheated samples and analysis of a number of samples showed fibrils similar to $D_1$, $D_2$ and $D_3$ in appearance. Dry tensile strengths were about 40 kg./mm.$^2$; wet tensile strengths were decreased to 4 to 5 kg./mm.$^2$. Shrinkage temperatures were lower by some 10% to 15%.

*Example VII*

Collagen dispersions from Example I were held under pressures of about 10,000 pounds/in.$^2$ for a period of 15 minutes. The collagen fibrils after this treatment, showed some increase in swelling. Dry and wet tensile strengths were about 40 to 45 kg./mm.$^2$ and 6 to 8 kg./mm.$^2$ respectively.

*Example VIII*

Collagen dispersions were prepared in a manner similar to those in Examples I and III, except that the enzyme and salt pretreatment steps were omitted. It was necessary to soak the tendon slices in the acid solution for almost 24 hours to produce a degree of swelling and workability in processing comparable with that observed in Examples I and III. Electron micrographs showed fibrils to be soft and flattened as illustrated in F. Dry tensile strengths were about 40 kg./mm.$^2$ and wet tensile strengths were essentially zero.

*Example IX*

Collagen dispersions were prepared in a manner similar to those in Example I, except that the acid swelling agent was lactic acid dissolved in a 15% solution of chlorethanol in water. With the latter mixed solvent in place of water as the solvent, a 3.0% dispersion of the tendon slices could be prepared and processed without having to resort to the use of higher temperatures and/or higher pressures. Physical properties of the films and casings prepared with this higher concentration of collagen dispersion were essentially the same as those reported in Example I.

*Example X*

As Example VIII except use 15% fluorethanol in water in place of water. Substantially the same results were obtained so far as physical properties are concerned.

*Example XI*

Collagen dispersions were prepared as in Example I except in place of 0.4% lactic acid, used 0.4% malonic acid. It was not possible to stretch these films as much as 10%. Shrinkage temperatures were on the average some 3% to 5% lower than those observed in Example I and dry and wet tensile strengths were reduced to 40 to 45 kg./mm.$^2$ and 2 to 3 kg./mm.$^2$ respectively.

*Example XII*

Collagen dispersions were prepared as in Example I except in place of 0.4% lactic acid, used 0.4% cyanoacetic acid. Results were essentially those observed in Example I.

*Example XIII*

Collagen dispersions were prepared as in Example I except in place of 0.4% lactic acid used 0.4% cyanopropionic acid, and swelling was performed at a temperature between 10° to 15° C. Results were essentially those observed in Example I except that the average wet tensile strengths decreased about 10% on an average.

*Example XIV*

Collagen dispersions were prepared as in Example I except in place of 0.4% lactic acid used 0.4% perfluorobutyric acid. Results were essentially those observed in Example I except that the dispersions were less viscous and subsequent treatment and extrusion were simpler.

*Example XV*

Collagen dispersions were prepared as in Example I, except in place of 0.4% lactic acid used 0.4% ω-trifluorobutyric acid and swelling was performed at a temperature below 10° C. Results were essentially those observed in Example I except that there was about a 10% decrease in wet tensile strength.

*Example XVI*

Collagen dispersions were prepared as in Example I, except in place of 0.4% lactic acid, used 0.5% acetic acid. It was not possible to impart as much as 10% stretch to the films during drying. Dry tensile strengths were about 35 to 40 kg./mm.$^2$ and wet tensile strengths were essentially negligible.

*Example XVII*

Collagen dispersions were prepared as in Example I, except in place of 0.4% lactic acid, used 0.4% 2,3-di hydroxy propionic acid. The results with this acid were essentially the same as those observed in Example I.

*Example XVIII*

As a starting material, the hard or branched portions of the beef tendon were used as starting material in place of the soft portions used in the above examples, particularly in Example I. Transverse slices of the order of 0.4 to 0.5 mm. were cut from the frozen and cleaned hard sections of the tendon. Subsequent treatment of these thinner slices was essentially the same as described in detail in Example I. In place of about 10% of partially swollen or unswollen material which was separated in the filtration step, about 17% to 20% was not used in the processing of the hard sections of the tendon. All physical properties of the films and casings were essentially the same as those observed in Example I except that there was about a 10% decrease in the average value of the wet tensile strength.

*Example XIX*

A mixture of ⅔ of a dispersion prepared according to Example I was mixed thoroughly with ⅓ of a dispersion prepared according to Example XVIII. There was no evidence in these blends of any dilution of physical properties, for all appeared to be about the same as those found with the films and casings in Example I.

Example XX

Calf skin which had been mechanically dehaired and defatted was washed in cold water and then sliced into ½ inch strips. These strips were then cut to slices 1 to 2 mm. thick. These slices then were treated in a manner similar to the tendon slices in Example I. Films and casings were prepared from these swollen collagen dispersions and were found to have relatively high tensile strengths but the dry tensile strengths averaged about 50 kg./mm.$^2$ and the wet tensile strengths averaged about 5 to 6 kg./mm.$^2$.

Example XXI

Collagen dispersions were prepared by a process similar to that in Example I except that sufficient nonionic detergent, composed of a mixture of 25% Arlacel 60 and 75% Tween 80 to make a 0.5% solution was added with the sodium carbonate in that stage proceeding the swelling. Subsequent processing was not changed and the final films and casings appeared to be somewhat lighter in color than those which were not treated with the nonionics. All physical properties of the films and casings were the same as those of Example I.

Example XXII

Collagen dispersions were prepared by a process similar to that in Example XXI except that sliced calf skin (as in Example XX) was used in place of tendon slices. The films produced by this additional processing involving use of nonionics, were much lighter in color than those not so treated. All physical properties of the films were the same as those of Example XX.

Example XXIII

Collagen dispersions were prepared by a process similar to that in Example I except in place of 0.4% lactic acid as swelling agent, used a citric acid-sodium dihydrogen phosphate buffer at pH 3.5 and an ionic strength of 0.05. The temperature of the swelling bath was kept between 5° to 10° C. and time of swelling was 7 to 8 hours. Shrinkage temperature of films prepared from this dispersion was between 60° to 62° C. Dry and wet tensile strengths were about 50 to 55 kg./mm.$^2$ and 8 to 10 kg./mm.$^2$ respectively.

Example XXIV

Collagen dispersions were prepared by a process similar to that in Example I except in place of 0.4% lactic acid as swelling agent, used a phosphate buffer (mixture of disodium phosphate and sodium hydroxide) at pH 9.4 and an ionic strength of 0.1. The temperature of the swelling bath was maintained between 5° and 10° C. and the time of swelling as 6 to 7 hours. Dry and wet tensile strength of films prepared from this dispersion were 45 to 50 kg./mm.$^2$ and 6 to 8 kg./mm.$^2$ respectively.

Example XXV

Collagen dispersions were prepared by a process similar to Example I except that in place of 0.4% lactic acid as swelling agent, used 1.5% solution of potassium tetroxalate at a temperature between 5° to 10° C. Dry and wet tensile strength of films prepared from this dispersion were 40 to 45 kg./mm.$^2$ and 5 to 7 kg./mm.$^2$ respectively.

It will be apparent from the foregoing examples that slight increases in temperature above the critical temperature, or increases in pressure or length of treatment cause a marked degradation in the collagen and a drop in wet strength of products made therefrom to virtually zero.

It will also be noted that the swelling agents which are most satisfactory for my process are dipolar in nature, i.e., they have at least two reactive sites on the molecule.

While I have set out certain preferred practices and embodiments of my invention in the foregoing specification it will be understood that the invention may be otherwise embodied within the scope of the following claims.

I claim:

1. The process of forming a film of reconstituted collagen comprising the steps of cutting the collagen source material into pieces one of whose dimensions does not exceed about 15 to 30 mils, treating said pieces with a solubilizing agent for non-collagenous protein including elastin and mucin, separating the remaining collagenous mass from the solubilized non-collagenous protein, treating the remaining collagen with a solubilizing agent for calcium and other bound ions and releasing lipids, non-collagenous proteins and non-collagenous impurities from the collagen, separating the collagen mass from the released non-collagenous impurities, subjecting the remaining collagen mass to a swelling treatment in the presence of a swelling agent, controlling the temperature below about 25° C. and the concentration and duration of the swelling operation so that the collagen retains its native axial periodicity, is free of amorphous characteristics and its diameter does not increase more than about 15% over that of the native collagen from which it was produced and its thermal shrinkage temperature when formed, dehydrated and stretched remains within about four degrees of the source material, extruding the mass into a dehydrating and coagulating bath, carrying the coagulated mass into a tanning bath and drying following tanning by gradually increasing the temperature as the water content of the collagen drops.

2. The process of preparing swollen collagen dispersions comprising the steps of cutting the collagen source material into pieces, one of whose dimension does not exceed about 30 mils, treating said pieces with a solubilizing agent for non-collagenous proteins including elastin and mucin, separating the remaining collagenous mass from the solubilized non-collagenous protein, treating the remaining collagen with a solubilizing agent for calcium and other bound ions and releasing lipids, non-collagenous proteins and non-collagenous impurities from the collagen, separating the collagen mass from the released non-collagenous impurities, subjecting the remaining collagen mass to a swelling treatment in the presence of a swelling agent, controlling the temperature below about 25° C. and the concentration and duration of the swelling operation so that the collagen retains its native axial periodicity, is free of amorphous characteristics and its diameter does not increase more than about 15% over the diameter of the native collagen from which it was produced and its thermal shrinkage temperature when formed, dehydrated and stretched, remains within about four degrees of the source material.

3. The process of forming a swollen collagen dispersion as claimed in claim 2 wherein the temperature is maintained between about 10° to 20° C. during the process.

4. The process of forming a swollen collagen dispersion as claimed in claim 2 wherein a non-ionic detergent is added to the treating water during the process.

5. The process of forming a swollen collagen dispersion as claimed in claim 2 wherein a fluidizing agent is added to the processing water during treatment.

6. The process of forming a swollen collagen dispersion as claimed in claim 2 wherein a protein softening agent is added during the processing.

7. An edible sausage casing having high wet strength and prepared by the process comprising the steps of cutting the collagen source material into pieces one of whose dimensions does not exceed about 15 to 30 mils, treating said pieces with a solubilizing agent for non-collagenous protein including elastin and mucin, separating the remaining collagenous mass from the solubilized non-collagenous protein, treating the remaining collagen with a solubilizing agent for calcium and other bound ions and releasing lipids, non-collagenous proteins and non-collagenous impurities from the collagen, separating the collagen mass from the released non-collagenous impurities, subjecting the remaining collagen mass to a swelling treatment in the presence of a swelling agent, controlling the temperature below about 25° C. and the concentration and duration of the swelling operation so that the collagen retains its native axial periodicity, is free of amorphous characteristics and its diameter does not increase more than about 15% over that of the native collagen from which it was produced and its thermal shrinkage temperature when formed, dehydrated and stretched remains within about four degrees of the source material, extruding the mass in the form of a hollow tube into a dehydrating and coagulating bath, carrying the coagulated mass into a tanning bath and drying following tanning by gradually increasing the temperature as the water content of the collagen drops.

8. An extruded, dehydrated, tanned and dried collagen film characterized by high wet strength and produced by the process comprising the steps of cutting the collagen source material into pieces one of whose dimensions does not exceed about 15 to 30 mils, treating said pieces with a solubilizing agent for non-collagenous protein including elastin and mucin, separating the remaining collagenous mass from the solubilized non-collagenous protein, treating the remaining collagen with a solubilizing agent for calcium and other bound ions and releasing lipids, non-collagenous proteins and non-collagenous impurities from the collagen, separating the collagen mass from the released non-collagenous impurities, subjecting the remaining collagen mass to a swelling treatment in the presence of a swelling agent, controlling the temperature below about 25° C. and the concentration and duration of the swelling operation so that the collagen retains its native axial periodicity, is free of amorphous characteristics and its diameter does not increase more than about 15% over that of the native collagen from which it was produced and its thermal shrinkage temperature when formed, dehydrated and stretched remains within about four degrees of the source material, extruding the mass into a dehydrating and coagulating bath, carrying the coagulated mass into a tanning bath and drying following tanning by gradually increasing the temperature as the water content of the collagen drops.

9. A dispersion of swollen collagen fibers in fluid suspension characterized by high wet strength and produced by the process comprising the steps of cutting the collagen source material into pieces, one of whose dimension does not exceed about 30 mils, treating said pieces with a solubilizing agent for non-collagenous proteins including elastin and mucin, separating the remaining collagenous mass from the solubilized non-collagenous protein, treating the remaining collagen with a solubilizing agent for calcium and other bound ions and releasing lipids, non-collagenous proteins and non-collagenous impurities from the collagen, separating the collagen mass from the released non-collagenous impurities, subjecting the remaining collagen mass to a swelling treatment in the presence of a swelling agent, controlling the temperature below about 25° C. and the concentration and duration of the swelling operation so that the collagen retains its native axial periodicity, is free of amorphous characteristics and its diameter does not increase more than about 15% over the diameter of the native collagen from which it was produced and its thermal shrinkage temperature when formed, dehydrated and stretched, remains within about four degrees of the source material.

10. The process of forming an extruded article of reconstituted collagen comprising the steps of cutting the collagen source material into pieces one of whose dimensions does not exceed about 15 to 30 mils, treating said pieces with a solubilizing agent for non-collagenous protein including elastin and mucin, separating the remaining collagenous mass from the solubilized non-collagenous protein, treating the remaining collagen with a solubilizing agent for calcium and other bound ions and releasing lipids, non-collagenous proteins and non-collagenous impurities from the collagen, separating the collagen mass from the released non-collagenous impurities, subjecting the remaining collagen mass to a swelling treatment in the presence of a swelling agent, controlling the temperature below about 25° C. and the concentration and duration of the swelling operation so that the collagen retains its native axial periodicity, is free of amorphous characteristics and its diameter does not increase more than about 15% over that of the native collagen from which it was produced and its thermal shrinkage temperature when formed, dehydrated and stretched remains within about four degrees of the source material, extruding the mass into a selected article form, and coagulating and hardening the extruded article.

11. An extruded, hardened collagen article characterized by high wet strength and produced by the process comprising the steps of cutting the collagen source material into pieces one of whose dimensions does not exceed about 15 to 30 mils, treated said pieces with a solubilizing agent for non-collagenous protein including elastin and mucin, separating the remaining collagenous mass from the solubilized non-collagenous protein, treating the remaining collagen with a solubilizing agent for calcium and other bound ions and releasing lipids, non-collagenous proteins and non-collagenous impurities from the collagen, separating the collagen mass from the released non-collagenous impurities, subjecting the remaining collagen mass to a swelling treatment in the presence of a swelling agent, controlling the temperature below about 25° C. and the concentration and duration of the swelling operation so that the collagen retains its native axial periodicity, is free of amorphous characteristics and its diameter does not increase more than about 15% over that of the native collagen from which it was produced and its thermal shrinkage temperature when formed, dehydrated and stretched remains within about four degrees of the source material, extruding the mass into a selected article form, coagulating the extruded article and hardening the coagulated and extruded article.

References Cited in the file of this patent

UNITED STATES PATENTS

| | | |
|---|---|---|
| 2,039,262 | Schulte | Apr. 28, 1936 |
| 2,046,541 | Becker | July 7, 1936 |
| 2,058,835 | Schulte | Oct. 27, 1936 |
| 2,454,716 | Ramsbottom et al. | Nov. 23, 1948 |
| 2,747,228 | Braun et al. | May 29, 1956 |
| 2,852,812 | Braun | Sept. 23, 1958 |
| 2,890,121 | Rinehart | June 9, 1959 |

FOREIGN PATENTS

| | | |
|---|---|---|
| 153,574 | Australia | Oct. 9, 1953 |

UNITED STATES PATENT OFFICE
CERTIFICATE OF CORRECTION

Patent No. 3,071,477                                  January 1, 1963

Howard B. Klevens

It is hereby certified that error appears in the above numbered patent requiring correction and that the said Letters Patent should read as corrected below.

Column 2, line 1, for "substantailly" read -- substantially --; line 32, after "640 A", strike out the period; line 64, for "640A." read -- 640 A --; column 3, line 47, for "wtih" read -- with --; column 4, line 4, for "homegeneous" read -- homogeneous --; column 5, line 44, for "periodically" read -- periodicity --; line 45, after "40 A", strike out the period; line 67, for "defated" read -- defatted --.

Signed and sealed this 27th day of August 27, 1963.

(SEAL)
Attest:
ERNEST W. SWIDER
Attesting Officer

DAVID L. LADD
Commissioner of Patents